United States Patent [19]

Kobashi et al.

[11] 4,380,983
[45] Apr. 26, 1983

[54] IGNITION TIMING CONTROL APPARATUS

[75] Inventors: Mamoru Kobashi, Aichi; Hideo Miyagi, Okazaki, both of Japan

[73] Assignee: Toyota Jidosha Kabushiki Kaisha, Toyota, Japan

[21] Appl. No.: 388,727

[22] Filed: Jun. 15, 1982

Related U.S. Application Data

[63] Continuation of Ser. No. 164,546, Jul. 2, 1980, abandoned.

[30] Foreign Application Priority Data

Jul. 6, 1979 [JP] Japan ................................ 54-92457

[51] Int. Cl.³ ............................................. F02P 5/04
[52] U.S. Cl. .................................... 123/424; 123/416; 123/418; 123/414
[58] Field of Search ............... 123/424, 416, 487, 478, 123/414

[56] References Cited

U.S. PATENT DOCUMENTS

| | | | |
|---|---|---|---|
| 3,910,243 | 10/1975 | Gau et al. | 123/424 |
| 4,138,976 | 2/1979 | Crall | 123/424 |
| 4,178,893 | 12/1979 | Aoki | 123/424 |
| 4,207,847 | 6/1980 | Hattori et al. | 123/418 |

FOREIGN PATENT DOCUMENTS

| | | | |
|---|---|---|---|
| 2259248 | 1/1974 | France | 123/424 |
| 2042638 | 8/1980 | United Kingdom | 123/424 |

Primary Examiner—Raymond A. Nelli
Attorney, Agent, or Firm—Kenyon & Kenyon

[57] ABSTRACT

Ignition timing is controlled in accordance with the engine's operating condition during the time the engine is in a normal operating condition. However, during the starting condition, the ignition timing is fixed to the top dead center in the compression stroke of each cylinder to be ignited.

6 Claims, 5 Drawing Figures

IGNITION TIMING CONTROL APPARATUS

This is a continuation of application Ser. No. 164,546 filed July 2, 1980 and now abandoned.

BACKGROUND OF THE INVENTION

The present invention relates to an ignition timing control apparatus of an internal combustion engine of the spark ignition type.

When the ignition timing of an engine is to be controlled based upon a spark advancing value which is digitally calculated relying upon various signals which indicate the operating condition of the engine, for example, relying upon rotational speed signals which indicate the rotational speed of the engine, intake amount signals which indicate the amount of the air sucked into the engine, and the like, it is accepted practice either to calculate, from the spark advancing value, a crank angle between a reference angle of the crankshaft and a crank angle corresponding to the ignition timing, or to calculate a value which corresponds to the period of time required by the crankshaft to rotate from a reference crank angle to a crank angle corresponding to the ignition timing. The value obtained by either calculation is preset, for example, in a downcounter and is counted down in response to clock signals which are produced by crank rotation of a predetermined angular increment or after every time interval of a predetermined length, respectively. The operation of the count down is started from the moment at which the crankshaft reaches the above-mentioned reference angle position, and the moment at which the counted value of the downcounter becomes zero determines an ignition spark timing.

However, when the engine is being cranked at starting, since the rotational speed, the intake vacuum and the intake air amount vary to a large extent, the ignition timing calculated in response to these various operating conditions changes greatly. Therefore, according to the above-mentioned conventional ignition timing control apparatus, stable engine operation cannot be obtained during starting.

SUMMARY OF THE INVENTION

It is, therefore, an object of the present invention to provide a computer controlled ignition timing control apparatus of an internal combustion engine capable of stabilizing the ignition timing during the starting condition of the engine.

According to the present invention, an ignition timing control apparatus of an internal combustion engine comprises: means for generting at least one electrical signal which indicates the operating condition of the engine; means, responding to the generated electrical signal, for calculating an optimum ignition timing at the operating condition of the engine, and for producing an ignition timing signal each time the crankshaft rotates to the calculated optimum ignition timing; means for generating a TDC signal which indicates when a piston in each cylinder reaches its top dead center (TDC) position in the compression stroke; means for generating a starting signal which indicates that the engine is in a starting condition; and means for applying sparks to the engine in response to the ignition timing signal when the starting signal is absent and for applying sparks to the engine in response to the TDC signal instead of the ignition timing signal when the starting signal appears.

The above and other related objects and features of the present invention will be apparent from the following description of the present invention with reference to the accompanying drawings and also from the appended claims.

DETAILED DESCRIPTION OF THE PREFERRED EMBODIMENT

Figure 1:
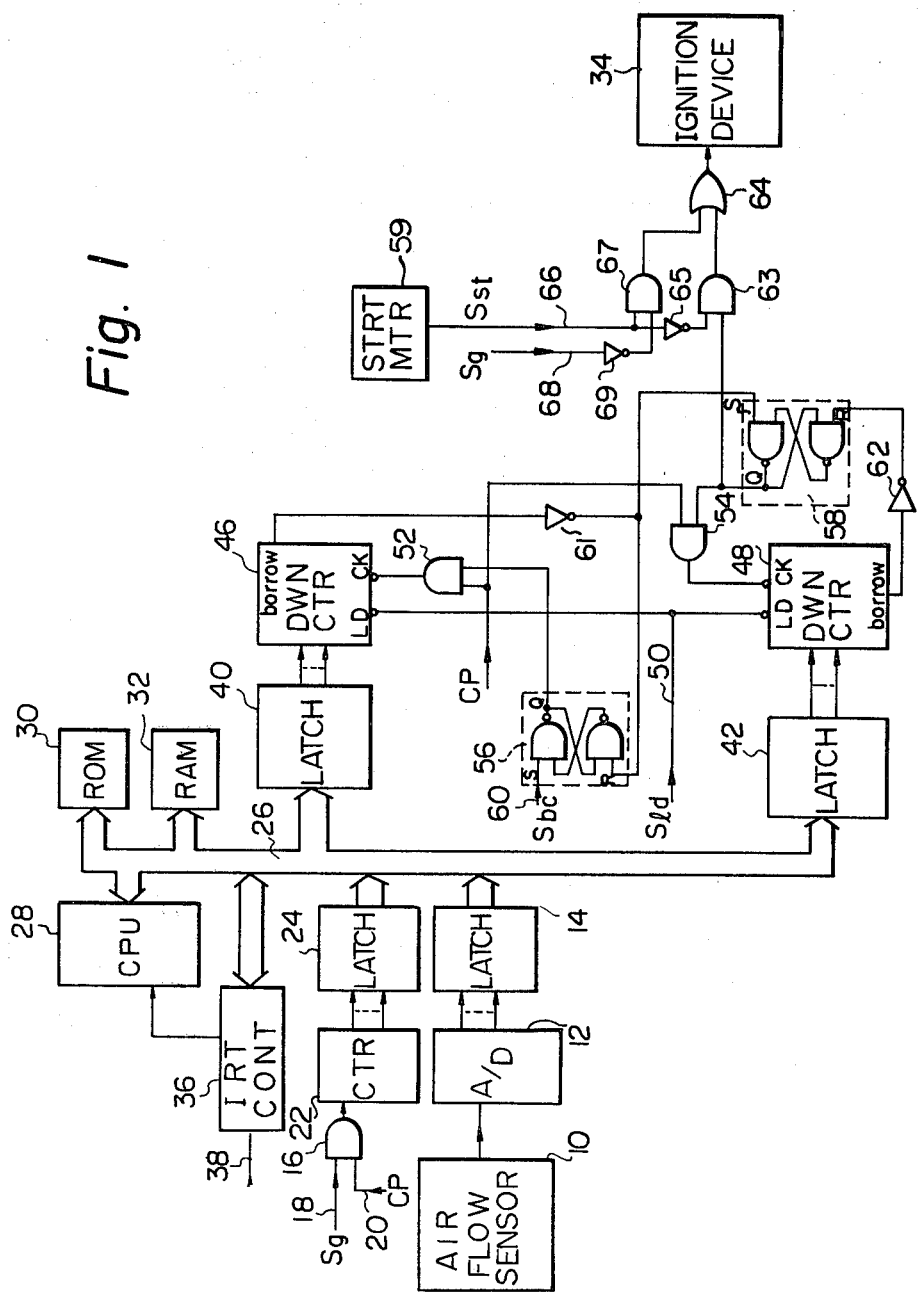
FIG. 1 is a block diagram of an ignition control system according to the present invention.

FIG. 1 is a block diagram of an ignition control system of an embodiment which is applied to spark ignition-type four-cycle internal combustion engines having six cylinders, in which explosion takes place at equal crank angles. In FIG. 1, reference numeral 10 denotes an air-flow sensor which produces an analog intake-air amount signal that represents the amount of the air sucked into the engine. The intake-air amount signal produced by the air-flow sensor 10 is converted into a binary coded intake-air amount signal Q through an analog-to-digital (A/D) converter 12, and is stored in a latching circuit 14 at a predetermined timing.

AND gate 16 is opened and closed by a gate signal Sg for detecting the rotational speed, which is supplied via a line 18 from a timing signal generation circuit that will be described later. While the AND gate 16 is open, the number of clock pulses CP introduced through a line 20 is counted by a counter 22. The gate signal Sg has a duration which is equal to the time required by a crankshaft (not illustrated) of the engine to turn by a predetermined angle, i.e., equal to the time required by the crankshaft to turn by 60° (indicated as 60° CA) in this embodiment, and the clock pulse CP has a predetermined period of, for example, 12.5 microseconds in this embodiment. Therefore, the counted value of the counter 22 is inversely proportional to the rotational speed Ne of the engine. This signal, 1/Ne, is stored in a latching circuit 24 at a predetermined timing.

The latching circuits 14 and 24 are connected to a central processing unit (CPU) 28, to a read only memory (ROM) 30 and to a random access memory (RAM) 32 via a data and address bus 26. The CPU 28 calculates the spark advance angle in accordance with a program which has been stored in the ROM 30, calculates the angle which represents a timing for permitting the current to flow into an ignition coil (not illustrated) in an ignition device 34, and further produces a value related to the ignition timing and a value related to the timing for permitting the current to flow based upon the above-calculated results.

Upon receipt of an interrupt timing signal Sirt from the above-mentioned timing signal generation circuit via a line 38, an interrupt control circuit 36 demands an interrupt processing for the CPU 28, so that the above-mentioned calculations are initiated.

To the bus 26, there are further connected a latching circuit 40 which receives the output signal related to the ignition timing from the CPU 28, and a latching circuit 42 which receives the output signal related to the timing for permitting the current to flow from the CPU 28. Preset terminals of presettable downcounters 46, 48 have been connected to the latching circuits 40, 42, respectively. When a load timing signal Sld is introduced through a line 50, the output signals stored in the latching circuit 40, 42 are preset to the counters 46, 48. The counters 46, 48 perform the counting operation in response to clock pulses CP of a predetermined period (12.5 microseconds) that are introduced through AND gates 52, 54, respectively. The opening and closing operations of the AND gates 52, 54 are controlled by the outputs Q of S-R flip-flops 56 and 58. The flip-flop 56 is set by a reference crank angle position signal Sbc which is supplied from the above-mentioned timing signal generation circuit via a line 60. The flip-flop 56 is reset and the flip-flop 58 is set by an inverted borrow output which is produced when the value of the downcounter 46 has reached zero, and which is inverted by an inverter 61. Further, the flip-flop 58 is reset by an inverted borrow output which is generated when the value of the downcounter 48 has reached zero, and which is inverted by an inverter 62.

The output terminal Q of the flip-flop 58 is connected to one input terminal of an AND gate 63. The output terminal of the AND gate 63 is connected to the input terminal of the ignition device 34 via an OR gate 64. The other input terminal of the AND gate 63 is connected to a line 66 via an inverter 65. Through this line 66, a start signal Sst, which is kept in a high level state only when the engine is in the starting condition, is applied from, for example, a starting motor 59. The line 66 is also connected to one input terminal of an AND gate 67 whose output terminal is connected to the input terminal of the ignition device 34 via the OR gate 64. The other input terminal of the AND gate 67 is connected to a line 68 via an inverter 69. Through this line 68, the aforementioned gate signal Sg is fed from the timing signal generation circuit. Although not illustrated, the ignition device 34 consists of an ignition coil, spark plugs of each of the cylinders connected to the secondary winding of the ignition coil via a distributor, and a switching circuit for permitting and interrupting the primary current of the ignition coil, depending upon the negative and positive edges of the input signal applied to the device 34, in a customary manner.

Figure 2:
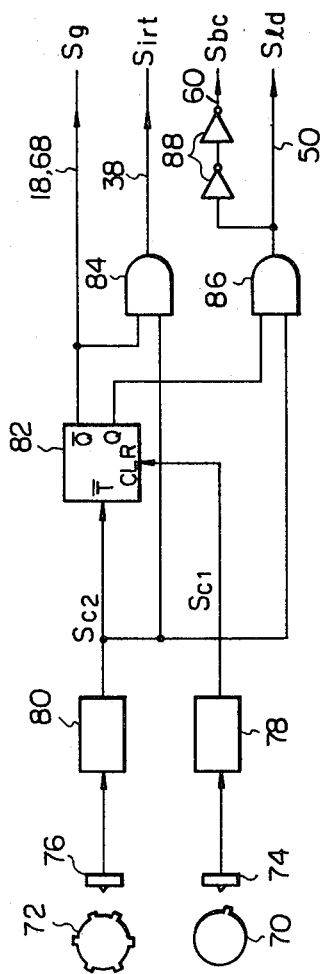
FIG. 2 is a block diagram of a timing signal generation circuit according to the present invention.
Figure 3:
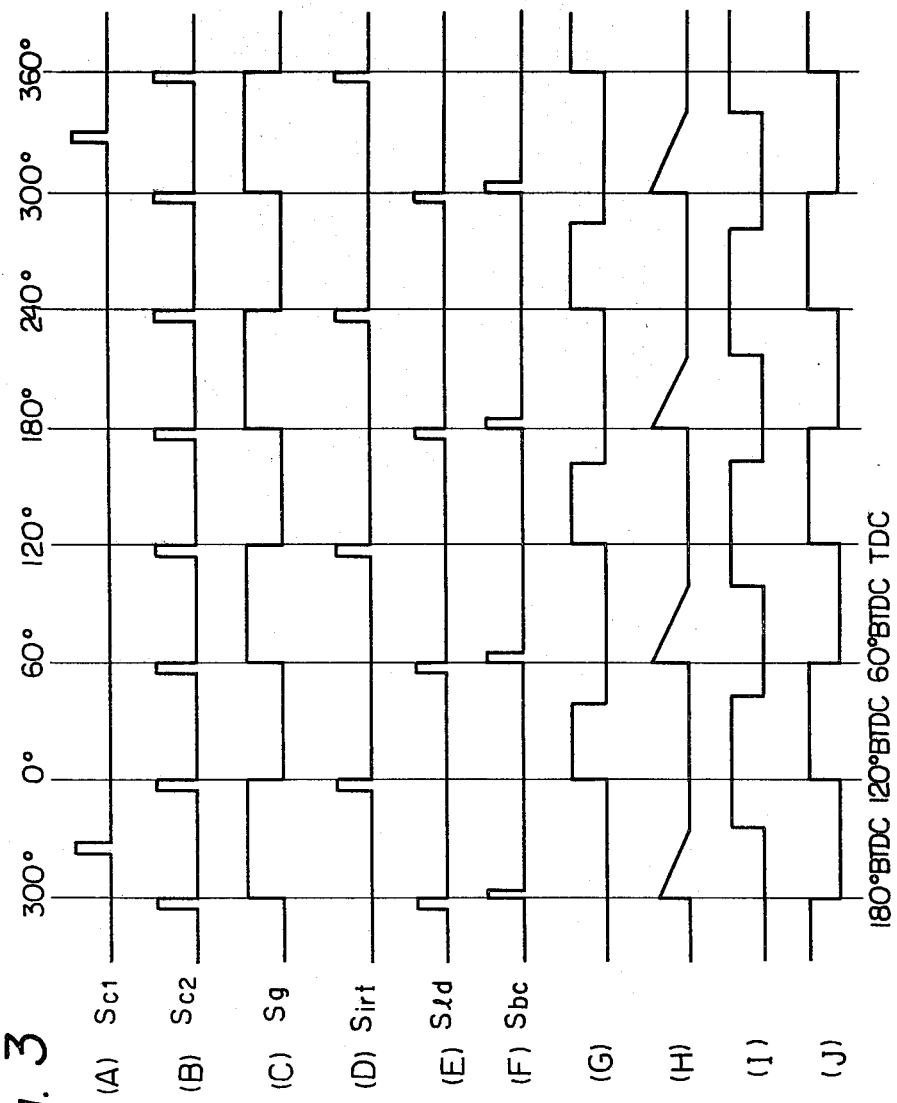
FIG. 3 illustrates wave forms of signals at each of the portions of circuits in FIGS. 1 and 2.

FIG. 2 is a block diagram illustrating an example of the aforementioned timing signal generation circuit, in which reference numerals 70 and 72 denote magnetic discs which rotates simultaneously with the crankshaft (not illustrated) of the engine. A single projection is provided on the circumference of the disc 70. As the projection passes by a magnetic pick-up sensor 74, a pulse is produced for every turn of the crankshaft, i.e., for every crank angle of 360°. On the other hand, a plurality of projections are formed along the circumference of the disc 72 at equal angles of 60°. As the projections pass by a magnetic pick-up sensor 76, a pulse is produced at every incremented crank angle of 60°. Wave forms of pulses from the sensors 74, 76 are shaped by wave form shaping circuits 78, 80 and are converted into crank angle position signals $Sc_1$, $Sc_2$, as illustrated by rows (A) and (B) of FIG. 3. FIG. 3 illustrates wave forms of signals at each of the portions of the circuits of FIGS. 1 and 2, wherein the abscissa represents crank angles of a given cylinder among the cylinders when the top dead center in the compression stroke is set to zero. The following description is based upon the above-mentioned crank angles. In FIG. 3, the symbol TDC denotes the top dead center in the compression stroke of each of the cylinders.

In FIG. 2, reference numeral 82 denotes a trigger-type flip-flop which will be triggered by a negative edge of a signal which is applied to a trigger input terminal T to invert outputs Q and $\overline{Q}$ of the flip-flop 82. When a signal is applied to a clear terminal CLR, the trigger-type flip-flop is cleared so that its outputs Q and $\overline{Q}$ become a low level state and a high level state, respectively. When the crank angle position signal $Sc_1$, illustrated in row (A) of FIG. 3, is applied to the clear terminal CLR of the flip-flop 82, an initial condition is synchronized with the crank angle position 0°. When the crank angle position signal $Sc_2$, illustrated in row (B) of FIG. 3, is applied to the flip-flop 82, the output $\overline{Q}$ of the flip-flop 82, that is, the gate signal Sg, remains at a high level state only during the periods corresponding to crank angles of 60° to 120°, 180° to 240°, and 300° to 360°, as illustrated in row (C) of FIG. 3. This gate signal Sg is applied to the AND gate 16, illustrated in FIG. 1, via the line 18 and, furthermore, to the inverter 69, illustrated in FIG. 1, via the line 68.

The output $\overline{Q}$ of the flip-flop 82 and the crank angle position signal $Sc_2$ are fed to an AND gate 84, whereby its output, i.e., the interrupt timing signal Sirt, assumes the wave form of a pulse which exhibits a negative edge at each of the crank angle positions 0°, 120° and 240°, in other words, at the TDC in the compression stroke of each of the cylinders, as illustrated in row (D) of FIG. 3. This interrupt timing signal Sirt is applied to the interruption control circuit 36, illustrated in FIG. 1, via the line 38. Since the output Q of the flip-flop 82 and the crank angle position signal $Sc_2$ are fed to an AND gate 86, a load timing signal Sld, which is the output of the AND gate 86, assumes the form of a pulse which exhibits a negative edge at each of the crank angle positions 60°, 180° and 300°, as illustrated in row (E) of FIG. 3. This load timing signal Sld is applied to load terminals of the downcounters 46 and 48, illustrated in FIG. 1, via the line 50. After having passed through delay elements 88, the load timing signal Sld serves as a reference crank angle position signal Sbc having a negative edge which slightly lags behind the above-mentioned timing, as illustrated in row (F) of FIG. 3. This reference crank angle position signal Sbc is applied to the set input terminal of the flip-flop 56, illustrated in FIG. 1, via the line 60.

The operation of the circuit of FIG. 1 is as follows. The demand for interrupt occurs when an interrupt timing signal Sirt is fed to the interrupt control circuit 36 at each of the crank angle positions 0°, 120° and 240°, as mentioned earlier, and the CPU 28 executes the interrupt operation. Row (G) of FIG. 3 illustrates periods for executing the interrupt operation by the CPU 28.

Figure 4:
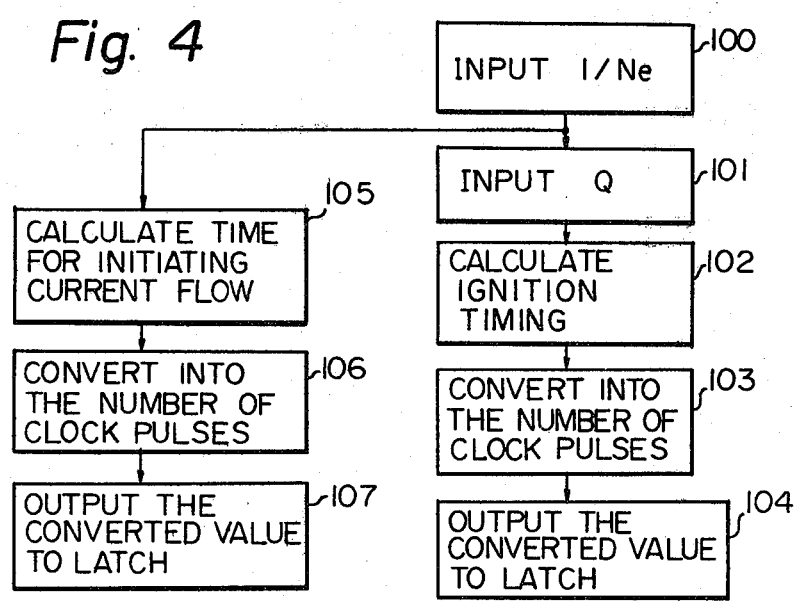
FIG. 4 is a flow chart of a program for performing arithmetic operations with respect to the ignition control.

FIG. 4 is a flow chart for executing the interrupt operation by the CPU 28. When it is requested to execute the interrupt, the CPU 28 introduces from the latching circuit 24 a speed signal 1/Ne which is inversely proportional to the rotational speed of the engine, at a point 100. Then, at a point 101, the signal Q related to the amount of the intake air is introduced from the latching circuit 14. At a point 102, the CPU 28 calculates an optimum ignition timing at the operating condition of the engine, which condition is represented by the introduced speed signal and intake air signal.

Figure 5:
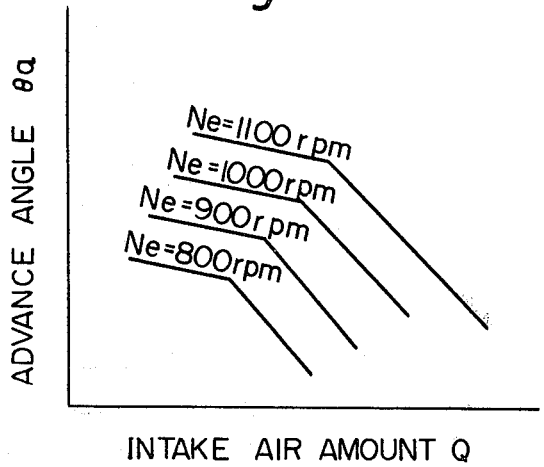
FIG. 5 illustrates the relationship among the spark advance angle $\theta_a$, the intake air amount Q and the rotational speed Ne.

Although there are various well-known methods for calculating the optimum ignition timing from these signals, the present embodiment uses the following described method. Namely, by using an algebraic function of $\theta_a = f(Ne, Q)$, which represents a preferred relationship among an optimum spark advance angle $\theta_a$, the amount Q of the intake air and the rotational speed Ne, as illustrated in FIG. 5, which function has been stored beforehand in the ROM 30, an optimum spark advance angle $\theta_a$ is calculated. Then, a crank angle $\theta_b$ between the reference crank angle position and the ignition timing corresponding to the calculated optimum spark advance angle $\theta_a$ is calculated. In this embodiment, since the reference crank angle position appears at a crank angle position which is ahead of the top dead center in the compression stroke of the next firing cylinder by a crank angle of 60°, i.e., the reference crank angle position appears at 60° CA·BTDC of the next cylinder to be ignited, the crank angle $\theta_b$ can be obtained, by a function of $\theta_b = 60° - \theta_a$.

Then the CPU 28 converts the calculated crank angle $\theta_b$ into time units. The conversion processing is to calculate a time $T_b$ required by the crankshaft to rotate a crank angle $\theta_b$; the time $T_b$ can be easily obtained by multiplying the crank angle $\theta_b$ by the speed data 1/Ne. At a point 103, CPU 28 converts the time $T_b$ into a number of clock pulses that should be counted by the counter 46 and, at a point 104, outputs the number of the clock pulses, that is the data related to the inigition timing, to the latching circuit 40.

The CPU 28, at a point 105, calculates the period of time between the ignition timing of the present cylinder and a time for initiating the flow of current into the primary winding of the ignition coil in order to supply spark energy to the next cylinder, by a well-known method. Then, CPU 28 converts, at a point 106, the calculated time period into the number of clock pulses which should be counted by the counter 48 and, at a point 107, outputs the converted number of the clock pulses, i.e., the data related to the time for permitting the flow of primary current, to the latching circuit 42.

A cylinder in which the top dead center in the compression stroke takes place at a crank angle of 120°, as illustrated in FIG. 3, will now be described. When an interrupt timing signal Sirt is produced at 120° CA·BTDC, as illustrated in row (D) of FIG. 3, the CPU 28 commences the above-mentioned arithmetic operation starting from 120° CA·BTDC, as illustrated in row (G) of FIG. 3. In this case, the speed signal data applied to the CPU 28 is data which is detected by gate signals of 180° to 120° CA·BTDC. At 60° CA·BTDC, since a load timing signal Sld is fed to the downcounters 46 and 48, the contents of the latching circuits 40 and 42 are fed to the counters 46 and 48 and stored therein, respectively. Since the reference crank angle position signal Sbc appears at a position which is approximately 60° CA·BTDC (refer to row (F) of FIG. 3), although it slightly lags behind the load timing signal Sld, the flip-flop 56 is set to initiate the counting operation of the downcounter 46. Row (H) of FIG. 3 illustrates the content of the downcounter 46. After having counted the preset value related to the ignition timing, the downcounter 46 produces a borrow output, and its inverted output causes the flip-flop 58 to be set and the flip-flop 56 to be reset. When the flip-flop 58 is set, the downcounter 48 commences the counting operation. After having counted the preset value related to the timing for initiating the flow of primary current, the counter 48 produces a borrow output, and its inverted output causes the flip-flop 58 to be reset. Therefore, the flip-flop 58 produces the output Q, as illustrated in row (I) of FIG. 3.

When the start signal Sst fed from the starting motor 59 via the line 66 is kept in a low level state, that is, when the engine is not in the starting condition, the AND gate 67 is closed and the AND gate 63 is opened. Therefore, in that case, the output Q from the flip-flop 58 is applied to the ignition device 34. Thus, the ignition device 34 is controlled such that the positive edge of the output Q corresponds to an ignition timing of a cylinder which is to be ignited this time, and the negative edge of the output Q corresponds to a timing for permitting the current to flow into the ignition coil so that the next cylinder will be ignited.

When the start signal Sst is kept in a high level state, that is, when the engine is in the starting condition, the AND gate 67 is opened, and the AND gate 63 is closed. Therefore, in this case, a signal, illustrated in row (J) of FIG. 3, produced by inverting the aforementioned gate signal Sg, illustrated in row (C) of FIG. 3, which is fed from the timing signal generation circuit, via the line 68, by the inverter 69, is applied to the ignition device 34. As a result, in this case, the ignition timing corresponds to the top dead center in the compression stroke of each cylinder, and the timing for permitting the current to flow into the ignition coil corresponds to 60° CA·BTDC.

According to the embodiment of the present invention as described above, when the engine is in the starting condition, the ignition timing is fixed to the top dead center in the compression stroke of each cylinder irrespective of the calculated optimum ignition timing. Therefore, during the starting condition, the ignition timing is not varied, and as a result the engine can be very easily started. Furthermore, according to this embodiment, since the above-mentioned ignition timing control during the starting condition of the engine is performed by an analog circuit, the ignition control apparatus can be obtained by a very simple construction.

As many widely different embodiments of the present invention may be constructed without departing from the spirit and scope of the present invention, it should be understood that the present invention is not limited to the specific embodiments described in this specification, except as defined in the appended claims.

We claim:

1. An electronic ignition control apparatus for a spark-ignition internal combustion engine having a crankshaft, a plurality of cylinders, and an equal plurality of pistons slidably mounted in respective cylinders and operatively connected to the crankshaft, said apparatus comprising:

means for generating at least one condition signal which indicates the operating condition of the engine when the engine is running;

means for generating a starting signal when the engine is in the starting condition;

a crankshaft position sensor having a single pickup for detecting a plurality of angularly spaced predetermined crankshaft positions including at least a fixed firing position for each cylinder;

means responsive to said single pickup for generating a crankshaft position signal when the crankshaft passes each predetermined position;

means responsive to said at least one condition signal for calculating an optimum ignition timing value for said operating condition of the engine;

means for selecting one of said crankshaft position signals from said single pickup occurring prior to the fixed firing position signal for each cylinder;

means responsive to said calculated optimum ignition timing value and to the selected one of said crankshaft position signals occurring prior to the fixed firing position signal for each cylinder for producing a calculated ignition timing signal for each cylinder when the crankshaft passes through a position corresponding to the calculated optimum ignition value for the respective cylinder;

means for selecting said calculated ignition timing signals for timing the sparks applied to the cylinders when the starting signal is absent and for selecting said fixed firing signals for timing the sparks applied to the cylinders when said starting signal is present.

2. An ignition timing control apparatus as claimed in claim 1, wherein said starting signal generating means includes a circuit for generating a high level signal which indicates that a starting motor of the engine is being energized.

3. An ignition timing control apparatus as claimed in claim 1 or 2, wherein said at least one electrical signal generating means includes means for generating a first electrical signal which represents the amount of air sucked into the engine and means for generating a second electrical signal which represents the rotational speed of the engine.

4. An ignition timing control apparatus as claimed in claim 3, wherein said means for calculating an optimum ignition timing value includes a digital computer programmed to calculate said timing value from predetermined functions describing a desired relationship between the amount of air sucked into the engine, the rotational speed of the engine and the optimum ignition timing.

5. An electronic ignition control apparatus according to claim 1 wherein the fixed firing position for each cylinder is the TDC position in the compression stroke of the corresponding piston.

6. An electronic ignition control apparatus according to claim 1 wherein said plurality of predetermined crankshaft positions sensed by said crankshaft position sensor consists of said fixed firing positions and a number of advance reference positions alternating with said fixed firing positions, and said means for selecting one of the crankshaft position signals occurring prior to the fixed firing position signal for each cylinder comprises means for discriminating between said advance reference position signals and said fixed firing position signals.

* * * * *

UNITED STATES PATENT AND TRADEMARK OFFICE
CERTIFICATE OF CORRECTION

PATENT NO. : 4,380,983

DATED : April 26, 1983

INVENTOR(S) : Mamoru Kobashi and Hideo Miyagi

It is certified that error appears in the above-identified patent and that said Letters Patent is hereby corrected as shown below:

On the title page assignee should read:

-- Toyota Jidosha Kogyo Kabushiki Kaisha --.

Signed and Sealed this

Twenty-second Day of November 1983

[SEAL]

Attest:

GERALD J. MOSSINGHOFF

Attesting Officer

Commissioner of Patents and Trademarks